US006430632B1

(12) United States Patent
Ain et al.

(10) Patent No.: US 6,430,632 B1
(45) Date of Patent: Aug. 6, 2002

(54) DATA MANAGEMENT SMALL COMPUTER SYSTEM INTERFACE (SCSI) EXTENDER FOR EXTENDING SCSI COMMUNICATIONS BETWEEN SCSI INTERFACES LOCATED RELATIVELY FAR APART

(75) Inventors: Jonathan Wade Ain; Donald Eugene Denning; Robert George Emberty; Craig Anthony Klein, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,603

(22) Filed: May 28, 1999

(51) Int. Cl.$^7$ .................. G06F 13/14; G06F 3/023; G06F 5/00
(52) U.S. Cl. ..................... 710/61; 710/2; 710/129; 710/240
(58) Field of Search ................. 710/1, 2, 58, 61, 710/113, 129, 106, 240; 709/200

(56) References Cited

U.S. PATENT DOCUMENTS

| | | | |
|---|---|---|---|
| 5,206,946 A | | 4/1993 | Brunk |
| 5,412,783 A | | 5/1995 | Skokan |
| 5,488,705 A | | 1/1996 | Labarbera |
| 5,528,765 A | | 6/1996 | Milligan |
| 5,715,274 A | | 2/1998 | Rostoker et al. |
| 5,748,924 A | | 5/1998 | Llorens et al. |
| 6,021,454 A | * | 2/2000 | Gibson .................. 710/129 |
| 6,078,979 A | * | 6/2000 | Li et al. ................ 710/129 |
| 6,085,278 A | * | 7/2000 | Gates et al. ............ 710/263 |
| 6,115,772 A | * | 9/2000 | Crater .................... 710/129 |
| 6,185,651 B1 | * | 2/2001 | Monia et al. ............ 710/240 |
| 6,209,023 B1 | * | 3/2001 | Dinitroff et al. ......... 709/211 |
| 6,304,930 B1 | * | 10/2001 | Yamauchi .............. 710/106 |

* cited by examiner

*Primary Examiner*—Thomas Lee
*Assistant Examiner*—Thuan Du
(74) *Attorney, Agent, or Firm*—Douglas R. Millett; Bracewell & Patterson, L.L.P.

(57) ABSTRACT

An improved system and method for extending interface communications for a SCSI. The system and method provides SCSI extenders that are able to extend SCSI communications over relatively long distances between at least two SCSI interfaces while also being fast and efficient in operation and inexpensive in implementation. The present system and method reduces latency, buffering, error recovery code, and other such additional hardware and software. SCSI signals are received from one SCSI interface, and the SCSI signals from the one SCSI interface are parallel loaded into a parallel register. The SCSI signals from the one SCSI interface are serialized into serial data, and the serial data from the parallel register is transmitted over an optical communication system. The transmitted serial data is converted back to the SCSI signals that were originally from the one SCSI interface. The SCSI signals that were originally from the one SCSI interface are received by and shifted into a data management and driver system, and the data management and driver system is used to manage and drive the SCSI signals from the one SCSI interface to another SCSI interface. The same system and methodology is applied to extend communications in both directions between the at least two SCSI interfaces. The data management and driver system arbitrates, selects, and drives SCSI signals from one SCSI interface to another SCSI interface. The data management and driver system includes a receive serial shift register and a driver logic device.

13 Claims, 6 Drawing Sheets

DATA MANAGEMENT SMALL COMPUTER SYSTEM INTERFACE (SCSI) EXTENDER FOR EXTENDING SCSI COMMUNICATIONS BETWEEN SCSI INTERFACES LOCATED RELATIVELY FAR APART

BACKGROUND OF THE INVENTION

1. Technical Field

The present invention relates in general to small computer system interface (SCSI) for computers and in particular to a SCSI optical extender that uses fiber optic cable and simple data management to couple and communicate between SCSI interfaces for computer systems and/or devices over extended distances.

2. Description of the Related Art

A small computer system interface (SCSI) is a well known and widely used type of interface in the computer field. A SCSI is generally used to couple a computer system to a device or to couple computer devices together. Communications are provided between a computer system and a device or provided between devices through the SCSI interfaces and by using a SCSI protocol. A SCSI, however, is limited to the distance within which signals may be able to traverse or be transmitted. Typically, signal degradation begins to occur for a SCSI within a twenty (20) meter range.

SCSI extenders were developed to overcome the distance limitations of a SCSI and the degradation of signals through SCSI cables. One conventional SCSI extender converts from SCSI to another protocol, such as fibre channel (FC), to extend the transmission of SCSI signals. Fibre channel (FC) is an optical form of transmission. A SCSI to FC converter is used to convert SCSI signals to FC signals. A fibre channel protocol is used to process the transmission of the fibre channel signals. A FC to SCSI converter is then used to convert the FC signals back into SCSI signals. However, latency exists for such SCSI extenders since data has to be buffered and conversion to another protocol needs to be implemented for extending SCSI communications. Therefore, drawbacks to SCSI extenders that use protocol conversion, such as the SCSI to FC and FC to SCSI conversion process, are that such implementations require buffering of data, conversion processes and algorithms, conversion hardware, error recovery code, extensive microcode or programming, and other such additional hardware and software for implementing protocol conversion in extending SCSI communications, which all add to the cost of the overall system and method and make the overall system and method more complex. Thus, such SCSI extenders that implement conversion processes and systems are relatively expensive.

It would therefore be advantageous and desirable to provide an improved system and method for extending interface communications for a SCSI. It would also be advantageous and desirable to have a system and method of providing SCSI extenders that are able to extend SCSI communications over relatively long distances while also being fast and efficient in operation and inexpensive in implementation. It would also be advantageous and desirable to provide a system and method to extend SCSI communications which reduces latency, buffering, error recovery code, and other such additional hardware and software. It would be advantageous and desirable to provide a system and method which avoids having to convert from SCSI to another protocol and then from the other protocol back to SCSI, such as from SCSI to FC and back from FC to SCSI, in order to provide extended communications for SCSI.

SUMMARY OF THE INVENTION

It is therefore one object of the present invention to provide an improved system and method for extending communications and interfaces for a SCSI.

It is another object of the present invention to provide a system and method of providing SCSI extenders that are able to extend SCSI communications over relatively long distances while also being fast and efficient in operation and inexpensive in implementation.

It is still another object of the present invention to provide a system and method to extend SCSI communications which reduces latency, buffering, error recovery code, and other such additional hardware and software.

It is a further object of the present invention to provide a system and method which avoids having to convert from SCSI to another protocol and then from the other protocol back to SCSI, such as from SCSI to FC and back from FC to SCSI, in order to provide extended communications for SCSI.

The foregoing objects are achieved as is now described. An improved system and method for extending interface communications for a SCSI. The system and method provides SCSI extenders that are able to extend SCSI communications over relatively long distances between at least two SCSI interfaces while also being fast and efficient in operation and inexpensive in implementation. The present system and method reduces latency, buffering, error recovery code, and other such additional hardware and software. SCSI signals are received from one SCSI interface, and the SCSI signals from the one SCSI interface are parallel loaded into a parallel register. The SCSI signals from the one SCSI interface are serialized into serial data, and the serial data from the parallel register is transmitted over an optical communication system. The transmitted serial data is converted back to the SCSI signals that were originally from the one SCSI interface. The SCSI signals that were originally from the one SCSI interface are received by and shifted into a data management and driver system, and the data management and driver system is used to manage and drive the SCSI signals from the one SCSI interface to another SCSI interface. The same system and methodology is applied to extend communications in both directions between the at least two SCSI interfaces. The data management and driver system arbitrates, selects, and drives SCSI signals from one SCSI interface to another SCSI interface. The data management and driver system includes a receive serial shift register and a driver logic device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a SCSI optical extender 10 that uses fiber optic cables 20 and 38 and simple data management algorithms to couple and communicate between SCSI interfaces on computer systems and/or devices over extended distances. The SCSI extender system 10 and methods 48, 49, 56, and 90 extend interface communications for a SCSI over relatively long distances while also being fast and efficient in operation and inexpensive in implementation. The system 10 and methods 48, 49, 56, and 90 extend SCSI communications which reduce latency, buffering, error recovery code, and other such additional hardware and software. The system 10 and IS methods 48, 49, 56, and 90 avoid having to convert from SCSI to another protocol and then from the other protocol back to SCSI, such as from SCSI to FC and back from FC to SCSI, in order to provide extended communications for SCSI. The present system 10 and methods 48, 49, 56, and 90 serializes the actual SCSI signals and shifts/transmits their values over fiber optic cables 20 or 38 and converts the values back to parallel data. The present SCSI extender system 10 and methods 48, 49, 56, and 90 remains in the SCSI domain.

Figure 1:
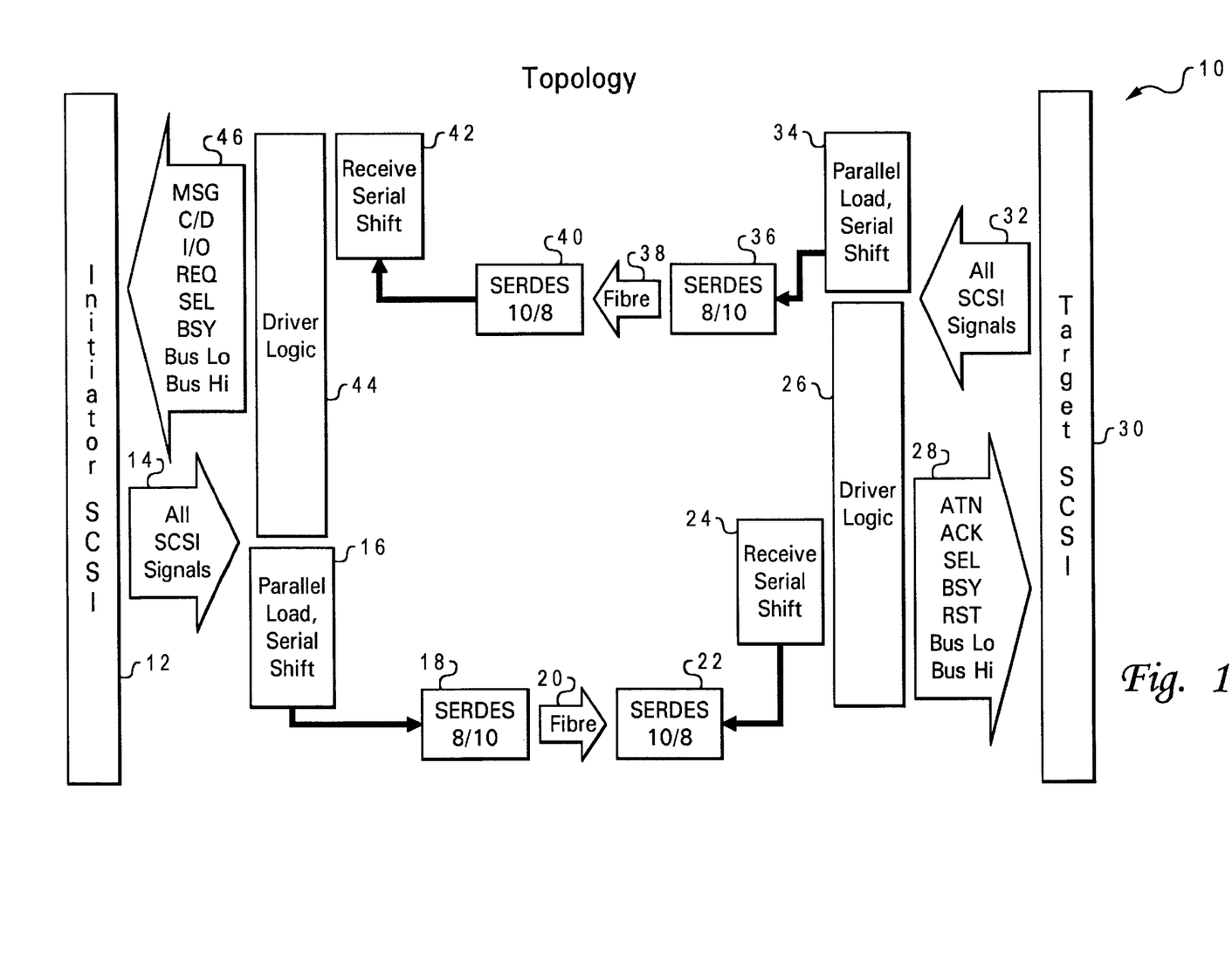
FIG. 1 is an overall block diagram of the present invention data management SCSI extender.

With reference now to the figures and in particular with reference to FIG. 1, an overall block diagram of the present invention data management SCSI extender 10 is shown. SCSI communication is extended between the initiator SCSI 12 and the target SCSI 30. FIG. 1 shows that all SCSI signals 14 from the initiator SCSI 12 are sampled and converted into 32 bit frames and loaded into a parallel register at block 16, and the signal data is converted and serially shifted out of the register. The SCSI signals are sent out to a 8 to 10 bit serializer/deserializer (SERDES) 18 which converts 8 bit serial words to 10 bit serial words, that is, which converts the parallel signals into serial data. The converted serial data is shifted out and transmitted over a fiber optic cable 20. The serial data is then converted back to parallel signals by a 10 to 8 bit serializer/deserializer (SERDES) 22. The converted back parallel signals are received at the receive serial shift register 24. The receive serial shift register 24 provides a way for the driver logic device 26 to view the logic data on the other end, that is, the logic data at the initiator end. The driver logic device 26 is located near the target SCSI 30, and it samples the data in the receive serial shift register 24. The driver logic device 26 manages the SCSI logic of the target SCSI 30. The driver logic device 26 is able to execute various initiator signals 28 from the initiator SCSI 12 to the target SCSI 30. The initiator signals 28 include but are not limited to ATN, ACK, SEL, BSY, RST, Bus Lo, and Bus Hi.

FIG. 1 also shows that all SCSI signals 32 from the target SCSI 30 are sampled and converted into 32 bit frames and loaded into a parallel register, and the converted signal data is serially shifted out of the register at block 34. The SCSI signals are sent out to a 8 to 10 bit serializer/deserializer (SERDES) 36 which converts 8 bit serial words to 10 bit serial words, that is, which converts the parallel signals into serial data. The converted serial data is shifted out and transmitted over a fiber optic cable 38. The serial data is then converted back to parallel signals by a 10 to 8 bit serializer/ deserializer (SERDES) 40. The converted back parallel signals are received at the receive serial shift register 42. The receive serial shift register 42 provides a way for the driver logic device 44 to view the logic data on the other end, that is, the logic data at the target end. The driver logic device 44 is located near the initiator SCSI 12, and it samples the data in the receive serial shift register 42. The driver logic device 44 manages the SCSI logic of the initiator SCSI 12. The driver logic device 44 is able to execute various target signals 46 from the target SCSI 30 to the initiator SCSI 12. The target signals 44 include but are not limited to MSG, C/D, I/O, REQ, SEL, BSY, Bus Lo, and Bus Hi.

Figure 2:
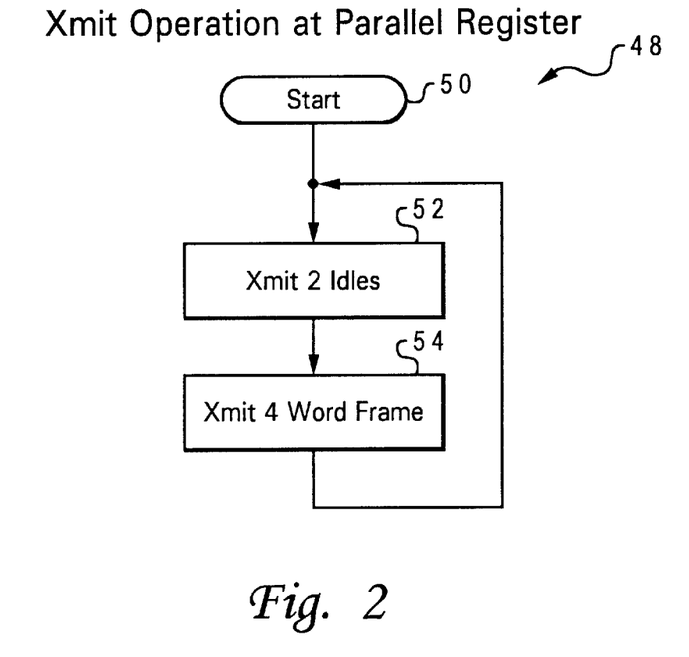
FIG. 2 is a block diagram of the transmit operation at the parallel register near either the initiator end or the target end for the present invention data management SCSI extender.

With reference now to the figures and in particular with reference to FIG. 2, a block diagram of the transmit operation 48 at the parallel register of block 16 or the parallel register at block 34 (of FIG. 1) to the SERDES 18 or 36 for the present invention data management SCSI extender 10 is shown. The transmit operation 48 starts at block 50. At block 52, two (2) idles are transmitted. The idles are transmitted to maintain synchronization of the SERDES 18 or 36. The transmit operation 48 moves to block 54 where a sample four (4) word frame, that is, the twenty seven bits received from a SCSI are equivalent to a four (4) byte wide word, is transmitted to the SERDES 18 or 36. Special characters are assigned to be recognized by the SERDES chip 18 or 36 for designating the idles and maintaining the synchronization. The transmit operation 48 then loops back to block 52 where the parallel register at block 16 or 34 further transmits two (2) idles and then transmits another four (4) word frame to the SERDES 18 or 36. The transmit operation 48 is a continuous operation by repeating the sampling of data at the parallel register and by transmitting/sending idles and data from the parallel register to SERDES 18 or 36. Through this transmittal operation, data is in no particular frame or format, but the general content of the data is maintained. Therefore, the transmit operation 48 samples data on one end in order to make it available at the other end (i.e. initiator SCSI 12 to target SCSI 30 or target SCSI 30 to initiator 12).

Figure 3:
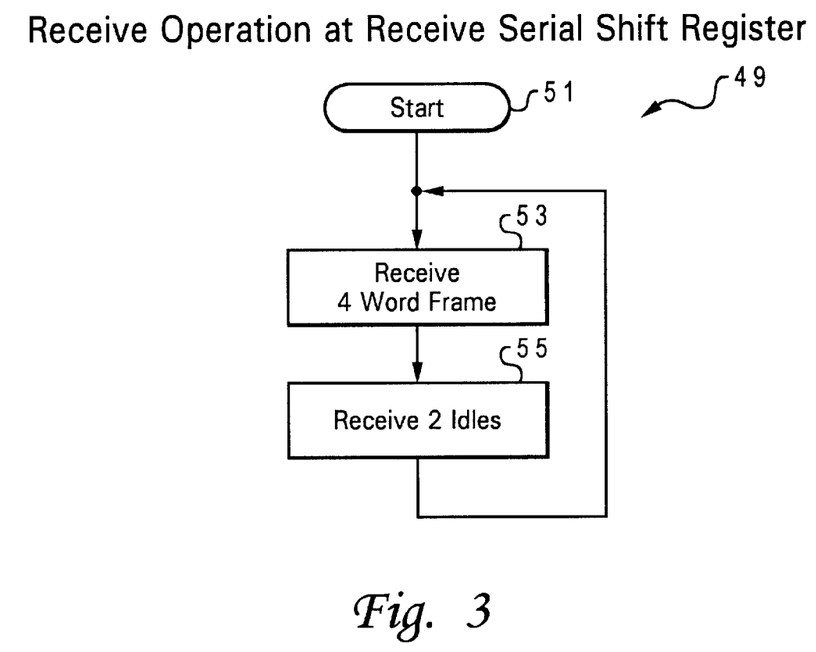
FIG. 3 is a block diagram of the receive operation at the receive serial shift register near either the initiator end or the target end for the present invention data management SCSI extender.

With reference now to the figures and in particular with reference to FIG. 3, a block diagram of the receive operation 49 at the receive serial shift register of block 24 or the receive serial shift register at block 42 (of FIG. 1) from the SERDES 22 or 40 for the present invention data management SCSI extender 10 is shown. The receive operation 49 starts at block 51. At block 53, a four (4) word frame, that is, the twenty seven bits received from a SCSI are equivalent to a four (4) byte wide word, is received. The receive operation 49 moves to block 55 where two (2) idles are received. The idles are received to maintain synchronization of the SERDES 22 or 40. Special characters are assigned to be recognized by the SERDES chip 22 or 40 for designating the idles and maintaining the synchronization. The receive operation 49 then loops back to block 53 where the receive serial shift register at block 24 or 42 further receives two (2) idles and then receives another four (4) word frame from SERDES 22 or 40. The receive operation 49 is a continuous operation by repeating the process in receiving data at the receive serial shift register 24 or 42 and receive idles and data from the SERDES 22 or 40 to the receive serial shift register 24 or 42. Through this receive operation, data is in no particular frame or format, but the general content of the data is maintained. Therefore, the receive operation 49 takes the sampled data on one end and makes the data available to the other end (i.e. initiator SCSI 12 to target SCSI 30 or target SCSI 30 to initiator 12).

Figure 4A:
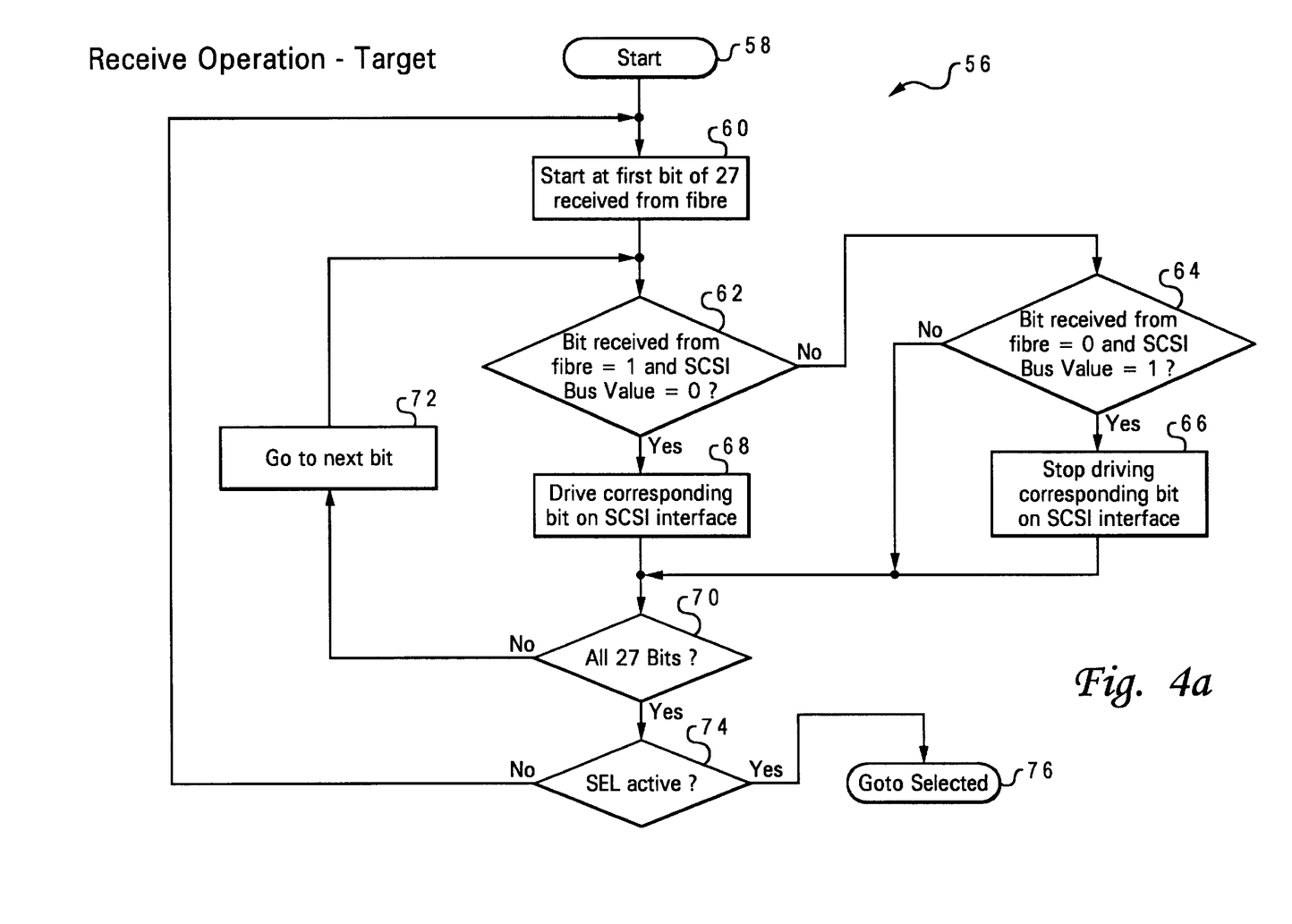
FIGS. 4a and 4b show a block diagram of the receive operation for the driver logic device at the target end for the present invention data management SCSI extender.
Figure 4B:
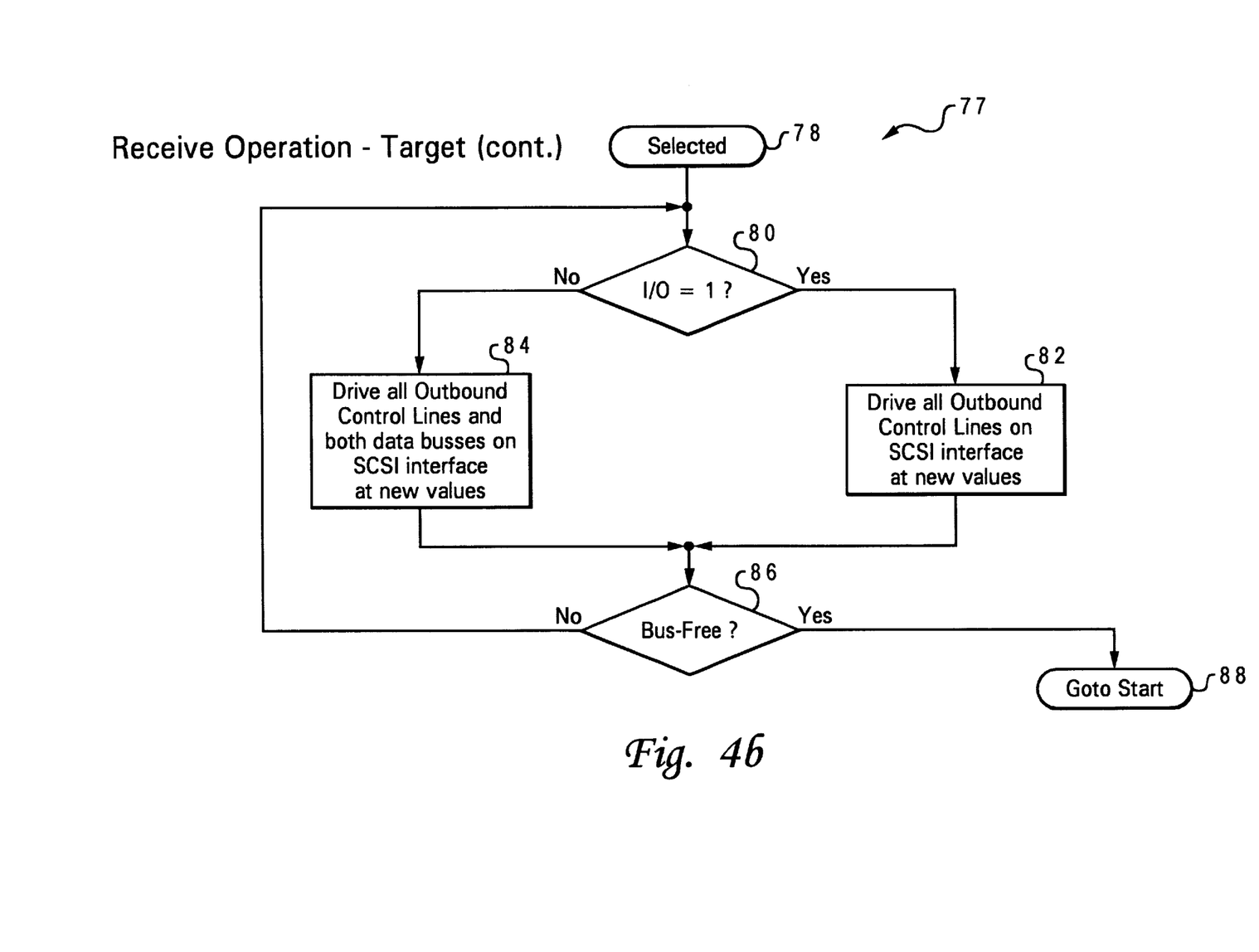

With reference now to the figures and in particular with reference to FIGS. 4a and 4b, a block diagram of the receive operation 56 for the driver logic device 26 near the target SCSI 30 for the present invention data management SCSI extender 10 is shown. The receive operation 56 starts at block 58. FIG. 4a shows the arbitration and selection phases of the receive operation 56 for the SCSI extender 10. A communication is arbitrated and selected by the SCSI extender 10 in the arbitration and selection phases shown in FIG. 4a.

At block 60, the receive operation 56 starts at the first bit of twenty seven (27) bits (i.e. four (4) words) that is received from the receive serial shift register 24, which in turn was received from the fiber optic cable 20. The data management of the receive operation 56 at the driver logic device 26 requires that the receive operation 56. keep track of the SCSI that originated the signals or data (i.e. either originated from the initiator SCSI 12 or the target SCSI 30). Otherwise, if such originating SCSI is not tracked, the receive operation 56 would be ultimately driven to a one (1) value and in an endless loop with the same SCSI value for both the initiator SCSI 12 and the target SCSI 30. The receive operation 56 moves to decision block 62 where it is determined whether the bit received from the fiber optic cable 20 equals one (1) and the SCSI bus value equals zero (0).

If the bit received from the fiber optic cable 20 equals one (1) and the SCSI bus value equals zero (0) at decision block 62, then the receive operation 56 moves to block 68 to drive the corresponding bit onto the SCSI interface 30. On the other hand, if the bit received from fiber optic cable 20 does not equal one (1) and the SCSI bus value at the target SCSI 30 does not equal zero (0), then the receive operation 56 moves to decision block 64. At decision block 64, the receive operation 56 determines whether the bit received from the fiber optic cable 20 equals zero (0) and the SCSI bus value at the target SCSI 30 equals one (1). If the bit received from the fiber optic cable 20 equals zero (0) and the SCSI bus value at the target SCSI 30 equals one (1), then the receive operation 56 moves to block 66. At block 66, the receive operation 56 stops driving the corresponding bit on the SCSI interface 30 and allows the SCSI bus value to go back to equaling zero (0). If, however, the bit received from the fiber optic cable 20 does not equal zero (0) and the SCSI bus value at the SCSI interface 30 does not equal one (1), then the bit equals the SCSI bus value, and the receive operation 56 moves directly to decision block 70.

Therefore, at decision blocks 62 and 64, the receive operation 56 determines whether the bit at the initiator end has been changed relative to the target end. If there has been a change at the initiator end, then the target end needs to change to match the initiator end. In other words, the receive operation 56 is set up so that, at decision block 62, if the bit received from the fiber optic cable 20 equals one (1) and the SCSI bus value at target SCSI 30 equals zero (0), then the receive operation 56 drives the SCSI bus value to equal one (1) to match the received bit. The receive operation 56 is also set up so that, at decision block 64, if the bit received from the fiber optic cable 20 equals zero (0) and the SCSI bus value at target SCSI 30 equals one (1), then the receive operation 56 stops driving the SCSI bus value at target SCSI 30 so that this SCSI bus value goes to zero (0) to match the received bit. Furthermore, after decision block 64, if the receive operation 56 has determined that the bit received from the fiber optic cable 20 equals zero (0) and the SCSI bus value at target SCSI 30 equals zero (0) or if the receive operation 56 has determined that the bit received from the fiber optic cable 20 equals one (1) and the SCSI bus value at target SCSI 30 equals one (1), then the receive operation 56 does not change any values of the target SCSI 30 since the values already match (i.e. reflects the originated signal value). Otherwise, if the receive operation 56 does not stop driving the target SCSI 30 at the appropriate time, then the target SCSI bus value would remain and be stuck at an one (1) or a high value endlessly in the communication loop.

At decision block 70, the receive operation 56 determines whether all twenty seven (27) bits have been received from the fiber optic cable 20. If all twenty seven (27) bits have been received, then the receive operation 56 moves directly to decision block 74. If all twenty seven (27) bits have not been received, then the receive operation 56 moves to block 72 to go get the next bit from the fiber optic cable 20, and the receive operation 56 loops back to decision block 62 where the process is repeated until all twenty seven (27) bits have been received and the receive operation 56 is at the decision block 74. At decision block 74, the receive operation 56 determines whether arbitration has ended, and a select has been activated wherein frames with priority are selected and frames without priority are dropped off the bus. If a select has not been activated, then the receive operation 56 loops back to block 60, and the receive operation 56 continues the arbitration phase and repeats the process by looping back to block 60. However, if a select has been activated, then the receive operation 56 moves to block 76 to a Goto Selected algorithm 77.

With reference to FIG. 4b, the receive operation 56 continues at the Goto Selected algorithm 77. The Goto Selected algorithm 77 starts at block 78. The twenty 146 seven bits received from the fiber optic cable 20 each has nine (9) bits that are Input/Output (I/O) control signal bits and eighteen (18) bits that are data bits. The algorithm 77 moves to decision block 80 where it is determined whether the input/output (I/O) control signals from the 27 bits are equal to one (1) or zero (0). The I/O control signals determine the driving direction of the data. If the I/O control signals equal one (1), then the data is inbound, that is, data is going from the target SCSI 30 to the initiator SCSI 12, and the receive operation 56 moves to block 82 where all outbound control lines on the target SCSI interface 30 are driven to the new values received from the fiber optic cable 20, that is, the data being received from the fiber optic cable 20. The data busses at the target SCSI side are being read while the data busses at the initiator SCSI side are being driven. On the other hand, if the I/O control signal equals zero (0), then the data is outbound, that is, data is going from the initiator SCSI 12 to the target SCSI 30, and the receive operation 56 moves to block 84 where all outbound control lines and both data busses (Bus Lo and Bus Hi) on the target SCSI 30 are driven to the new values received from the fiber optic cable 20, that is, the data being received from the fiber optic cable 20.

At decision block 86, the receive operation 56 determines whether the bus is free. If the bus is not free, then the receive operation 56 loops back to decision block 80 and repeats the Goto Selected algorithm 77 to attempt further driving of the new values to the SCSI interface. On the other hand, if the bus is free, then the receive operation 56 moves to block 88 to loop back to the start of the receive operation 56 at block 58.

Figure 5A:
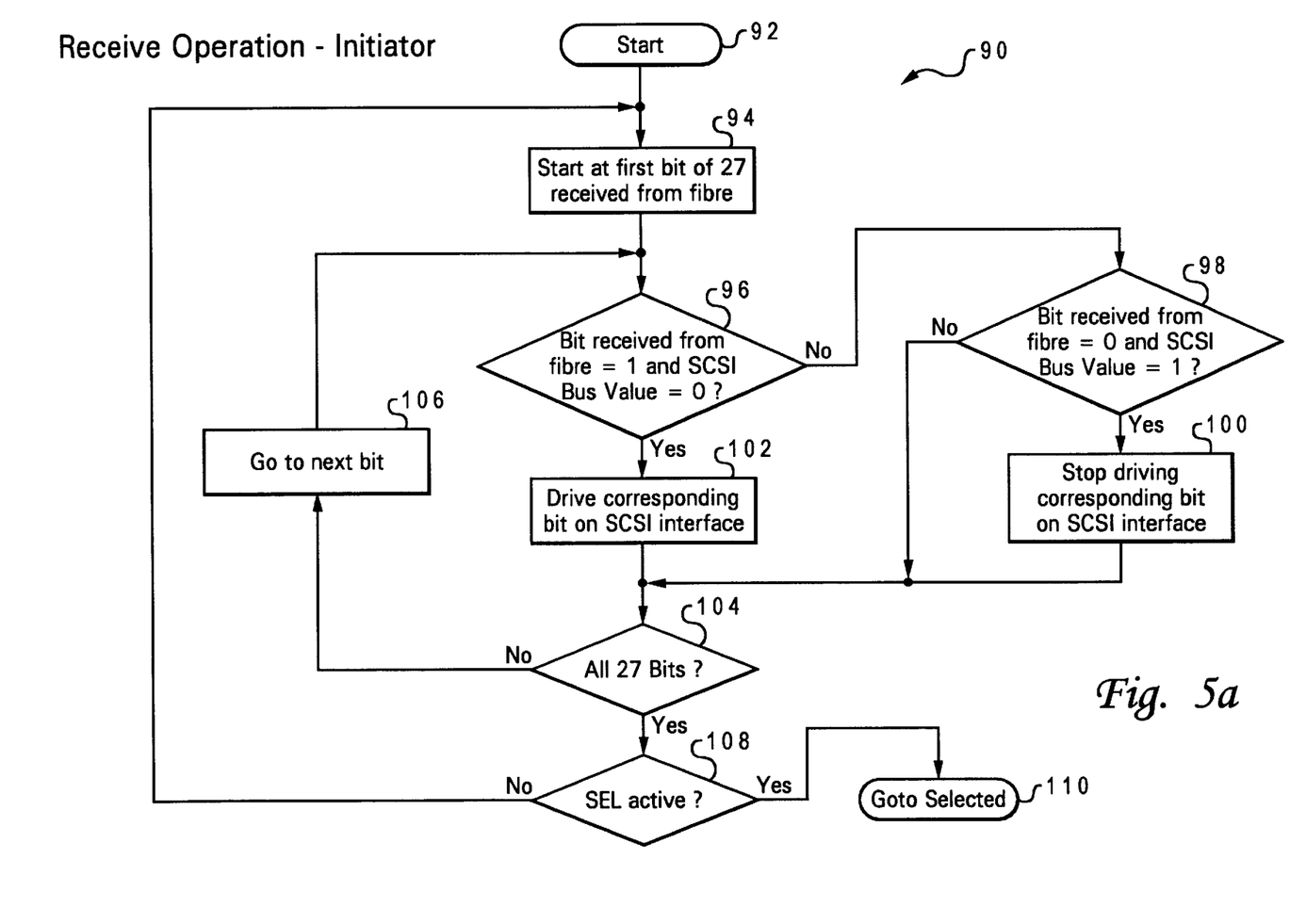
FIGS. 5a and 5b show a block diagram of the receive operation for the driver logic device at the initiator end for the present invention data management SCSI extender.
Figure 5B:
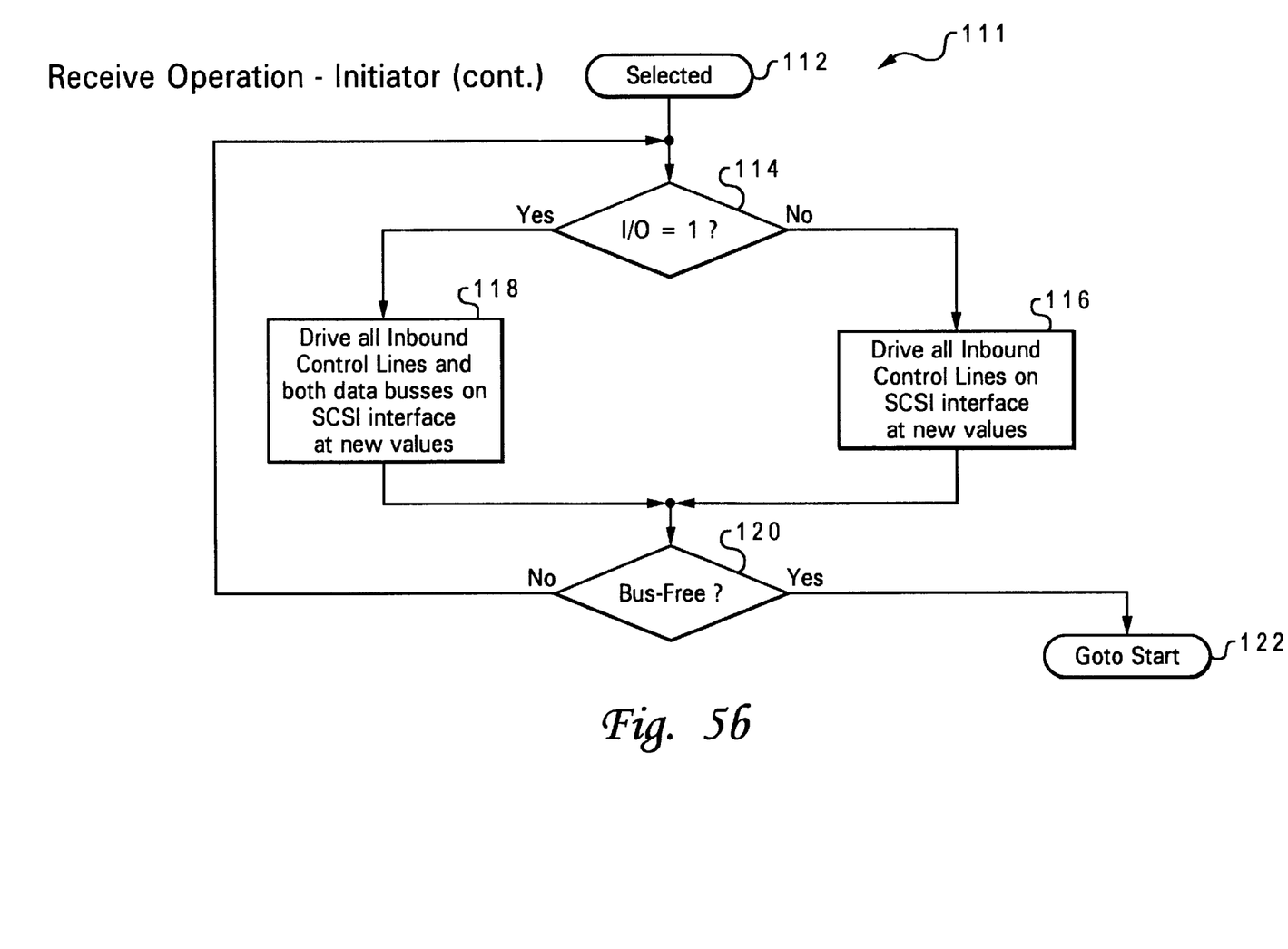

With reference now to the figures and in particular with reference to FIGS. 5a and 5b, a block diagram of the receive operation 90 for the driver logic device 44 near the initiator SCSI 12 for the present invention data management SCSI extender 10 is shown. The receive operation 90 starts at block 92. FIG. 5a shows the arbitration and selection phases of the receive operation 90 for the SCSI extender 10. A communication is arbitrated and selected by the SCSI extender 10 in the arbitration and selection phases shown in FIG. 5a.

At block 94, the receive operation 90 starts at the first bit of twenty seven (27) bits (i.e. four (4) words) that is received from the receive serial shift register 42, which in turn was received from the fiber optic cable 38. The data management of the receive operation 90 at the driver logic device 44 requires that the receive operation 90 keep track of the SCSI that originated the signals or data (i.e. either originated from the initiator SCSI 12 or the target SCSI 30). Otherwise, if such originating SCSI is not tracked, the receive operation 90 would be ultimately driven to a one (1) value and in an endless loop with the same SCSI value for both the initiator SCSI 12 and the target SCSI 30. The receive operation 90 moves to decision block 96 where it is determined whether the bit received from the fiber optic cable 38 equals one (1) and the SCSI bus value equals zero (0).

If the bit received from the fiber optic cable 38 equals one (1) and the SCSI bus value equals zero (0) at decision block 96, then the receive operation 90 moves to block 102 to drive the corresponding bit onto the SCSI interface 12. On the other hand, if the bit received from fiber optic cable 38 does not equal one (1) and the SCSI bus value at the initiator SCSI 12 does not equal zero (0), then the receive operation 90 moves to decision block 108. At decision block 108, the receive operation 90 determines whether the bit received from the fiber optic cable 38 equals zero (0) and the SCSI bus value at the initiator SCSI 12 equals one (1). If the bit received from the fiber optic cable 38 equals zero (0) and the SCSI bus value at the initiator SCSI 12 equals one (1), then the receive operation 90 moves to block 100. At block 100, the receive operation 90 stops driving the corresponding bit on the SCSI interface 12 and allows the SCSI bus value to go back to equaling zero (0). If, however, the bit received from the fiber optic cable 38 does not equal zero (0) and the SCSI bus value at the SCSI interface 12 does not equal one (1), then the bit equals the SCSI bus value, and the receive operation 90 moves directly to decision block 104.

Therefore, at decision blocks 96 and 98, the receive operation 90 determines whether the bit at the target end has been changed relative to the initiator end. If there has been a change at the target end, then the initiator end needs to change to match the target end. In other words, the receive operation 90 is set up so that, at decision block 96, if the bit received from the fiber optic cable 38 equals one (1) and the SCSI bus value at initiator SCSI 12 equals zero (0), then the receive operation 90 drives the SCSI bus value to equal one (1) to match the received bit. The receive operation 90 is also set up so that, at decision block 98, if the bit received from the fiber optic cable 38 equals zero (0) and the SCSI bus value at initiator SCSI 12 equals one (1), then the receive operation 90 stops driving the SCSI bus value at initiator SCSI 12 so that this SCSI bus value goes to zero (0) to match the received bit. Furthermore, after decision block 98, if the receive operation 90 has determined that the bit received from the fiber optic cable 38 equals zero (0) and the SCSI bus value at initiator SCSI 12 equals zero (0) or if the receive operation 90 has determined that the bit received from the fiber optic cable 38 equals one (1) and the SCSI bus value at initiator SCSI 12 equals one (1), then the receive operation 90 does not change any values of the initiator SCSI 12 since the values already match (i.e. reflects the originated signal value). Otherwise, if the receive operation 90 does not stop driving the initiator SCSI 12 at the appropriate time, then the initiator SCSI bus value would remain and be stuck at an one (1) or a high value endlessly in the communication loop.

At decision block 104, the receive operation 90 determines whether all twenty seven (27) bits have been received from the fiber optic cable 38. If all twenty seven (27) bits have been received, then the receive operation 90 moves directly to decision block 108. If all twenty seven (27) bits have not been received, then the receive operation 90 moves to block 106 to go get the next bit from the fiber optic cable 38, and the receive operation 90 loops back to decision block 96 where the process is repeated until all twenty seven (27) bits have been received and the receive operation 90 is at the decision block 108. At decision block 108, the receive operation 90 determines whether arbitration has ended, and a select has been activated wherein all those frames without priority are dropped off the bus. If a select has not been activated, then the receive operation 90 loops back to block 94, and the receive operation 90 continues the arbitration phase and repeats the process by looping back to block 94. However, if a select has been activated, then the receive operation 90 moves to block 110 to a Goto Selected algorithm 111.

With reference to FIG. 5b, the receive operation 90 continues at the Goto Selected algorithm 111. The Goto Selected algorithm 111 starts at block 112. The twenty seven bits received from the fiber optic cable 38 each has nine (9) bits that are Input/Output (I/O) control signal bits and eighteen (18) bits that are data bits. The algorithm 111 moves to decision block 114 where it is determined whether the input/output (I/O) control signals from the 27 bits are equal to one (1) or zero (0). The I/O control signals determine the driving direction of the data. If the I/O control signals equal zero (0), then the data is outbound, that is, data is going from the initiator SCSI 12 to the target SCSI 30, and the receive operation 90 moves to block 116 where all inbound control lines on the initiator SCSI interface 12 are driven to the new values received from the fiber optic cable 38, that is, the data being received from the fiber optic cable 38. The data busses at the initiator SCSI side are being read while the data busses at the target SCSI side are being driven. On the other hand, if the I/O control signal equals one (1), then the data is inbound, that is, data is going from the target SCSI 30 to the initiator SCSI 12, and the receive operation 90 moves to block 118 where all inbound control lines and both data busses (Bus Lo and Bus Hi) on the initiator SCSI 12 are driven to the new values received from the fiber optic cable 38, that is, the data being received from the fiber optic cable 38.

At decision block 120, the receive operation 90 determines whether the bus is free. If the bus is not free, then the receive operation 90 loops back to decision block 114 and repeats the Goto Selected algorithm 111 to attempt further driving of the new values to the SCSI interface. On the other hand, if the bus is free, then the receive operation 90 moves to block 122 to loop back to the start of the receive operation 90 at block 92.

Therefore, a SCSI optical extender 10 that uses fiber optic cables 20 and 38 and simple data management algorithms to couple and communicate between SCSI interfaces on computer systems and/or devices over extended distances is provided.

While the invention has been particularly shown and described with reference to a preferred embodiment, it will be understood by those skilled in the art that various changes in form and detail may be made therein without departing from the spirit and scope of the invention.

What is claimed is:

1. A method of extending SCSI communications between at least two SCSI interfaces comprising the steps of:

receiving SCSI signals from one of the at least two SCSI interfaces, parallel loading the SCSI signals from the one of the at least two SCSI interfaces into a parallel register,
serializing the SCSI signals from the one of the at least two SCSI interfaces into serial data,
transmitting the serial data derived from the parallel register over an optical communication system,
converting the transmitted serial data back to the SCSI signals from the one of the at least two SCSI interfaces,
shifting and receiving the SCSI signals from the one of the at least two SCSI interfaces into a data management and driver system;
using the data management and driver system to manage and drive the SCSI signals from the one of the at least two SCSI interfaces to another of the at least two SCSI interfaces;
receiving SCSI signals from the another of the at least two SCSI interfaces,
parallel loading the SCSI signals from the another of the at least two SCSI interfaces into another parallel register,
serializing the SCSI signals from the another of the at least two SCSI interfaces into serial data,
transmitting the serial data derived from the another parallel register over another optical communication system,
converting the transmitted serial data back to the SCSI signals from the another of the at least two SCSI interfaces,
shifting and receiving the SCSI signals from the another of the at least two SCSI interfaces into another data management and driver system, and
using the another data management and driver system to manage and drive the SCSI signals from the another of the at least two SCSI interfaces to the one of the at least two SCSI interfaces;
wherein the step of shifting and receiving from the one of the at least two SCSI interfaces further comprises the steps of:
receiving the SCSI signals from the one of the at least two SCSI interfaces,
arbitrating between the SCSI signals as to which of the SCSI signals are to be
transmitted to the another of the at least two SCSI interfaces,
selecting a set of the SCSI signals that the one of the at least two SCSI interfaces
will transmit to the another of the at least two SCSI interfaces, and
driving the set of the SCSI signals from the one of the at least two SCSI interfaces
to the another of the at least two interfaces; and
wherein the arbitrating step further comprises the step of:
receiving a bit from twenty seven bits of the converted back SCSI signals from the one of the at least two SCSI interfaces,
determining whether the bit is equal to one and a bus value of the another of the at
least two SCSI interfaces equals zero,
driving the bus value to equal one if the bit is equal to one and the bus value is equal to zero,
determining whether the bit is equal to zero and the bus value is equal to one if the
bit is not equal to one and the bus value is not equal zero,
stopping drive of the bus value to allow the bus value to equal zero if the bit is
equal to zero and the bus value is equal to one,
moving directly to determine if all of the twenty seven bits have been processed if
the bit is equal to the bus value,
determining if all of the twenty seven bits have been processed,
obtaining a next bit and repeating the above steps if all of the twenty seven bits have not been processed, and
determining whether a select has been activated to end the arbitrating step.

2. The method according to claim 1 wherein the steps of transmitting the serial data each further comprises the steps of:
transmitting two idles for maintaining synchronization of the serializing step, and transmitting a four word frame from the serial data.

3. The method according to claim 2, wherein the transmitting steps are continuously repeated.

4. The method according to claim 1 wherein the shifting and receiving steps each further comprises the steps of:
receiving a four word frame from the serial data, and
receiving two idles for maintaining synchronization of the converting step.

5. The method according to claim 4, wherein the receiving steps are continuously repeated.

6. The method according to claim 1 wherein:
the shifting and receiving steps each further comprises the step of receiving the converted back SCSI signals in a receive serial shift register that is in communication with a driver logic device, and
the using the data management and driver system steps each further comprises the step of using the driver logic device to manage and drive the SCSI signals.

7. The method according to claim 1 wherein the selecting step further comprises the step of:
selecting the SCSI signals with priority and dropping the SCSI signals without priority.

8. A method of extending SCSI communications between at least two SCSI interfaces comprising the steps of:
receiving SCSI signals from one of the at least two SCSI interfaces,
parallel loading the SCSI signals from the one of the at least two SCSI interfaces into a parallel register,
serializing the SCSI signals from the one of the at least two SCSI interfaces into serial data, transmitting the serial data derived from the parallel register over an optical communication system,
converting the transmitted serial data back to the SCSI signals from the one of the at least two SCSI interfaces,
shifting and receiving the SCSI signals from the one of the at least two SCSI interfaces into a data management and driver system, and
using the data management and driver system to manage and drive the SCSI signals from the one of the at least two SCSI interfaces to another of the at least two SCSI interfaces;
receiving SCSI signals from the another of the at least two SCSI interfaces, parallel loading the SCSI signals from the another of the at least two SCSI interfaces into another parallel register,
serializing the SCSI signals from the another of the at least two SCSI interfaces into serial data,
transmitting the serial data derived from the another parallel register over another optical communication system, converting the transmitted serial data back to the SCSI signals from the another of the at least two SCSI interfaces, shifting and receiving the SCSI signals from the another of the at least two SCSI interfaces in to another data management and driver system, and using the another data management and driver system to manage and drive the SCSI signals from the another of the at least two SCSI interfaces to the one of the SCSI interfaces;

wherein the step of shifting and receiving from the one of the at least two SCSI interfaces receiving the SCSI signals from the one of the at least two SCSI interfaces, arbitrating between the SCSI signals as to which of the SCSI signals are to be transmitted to the another of the at least two SCSI interfaces, selecting a set of the SCSI signals that the one of the at least two SCSI interfaces will transmit to the another of the at least two SCSI interfaces, and driving the set of the SCSI signals from the one of the at least two SCSI interfaces to the another of the at least two interfaces;

wherein the step of driving the set of the SCSI signals further comprises the steps of:

determining whether an input/output control signal from the SCSI signals has an one value, driving all outbound control lines at the another of the at least two interfaces to data having new values based on the SCSI signals which are inbound from the another of the at least two SCSI interfaces to the one of the at least two SCSI interfaces if the input/output control signal is equal to one, and driving all outbound control lines and data busses at the another of the at least two interfaces to data having new values based on the SCSI signals which are outbound from the one of the at least two SCSI interfaces to the another of the at least two SCSI interfaces if the input/output control signal is equal to zero.

9. The method according to claim 8 further comprising the steps of:

determining whether a bus at the another of the at least two SCSI interfaces is free, repeating the steps for the driving step if the bus is not free, and repeating all of the method steps if the bus is free.

10. A method of extending SCSI communications between at least two SCSI interfaces comprising the steps of:

receiving SCSI signals from one of the at least two SCSI interfaces, parallel loading the SCSI signals from the one of the at least two SCSI interfaces into a parallel register, serializing the SCSI signals from the one of the at least two SCSI interfaces into serial data, transmitting the serial data derived from the parallel register over an optical communication system, converting the transmitted serial data back to the SCSI signals from the one of the at least two SCSI interfaces, shifting and receiving the SCSI signals from the one of the at least two SCSI interfaces into a data management and driver system, and using the data management and driver system to manage and drive the SCSI signals from the one of the at least two SCSI interfaces to another of the at least two SCSI interfaces;

receiving SCSI signals from the another of the at least two SCSI interfaces, parallel loading the SCSI signals from the another of the at least two SCSI interfaces into another parallel register, serializing the SCSI signals from the another of the at least two SCSI interfaces into serial data, transmitting the serial data derived from the another parallel register over another optical communication system, converting the transmitted serial data back to the SCSI signals from the another of the at least two SCSI interfaces, shifting and receiving the SCSI signals from the another of the at least two SCSI interfaces into another data management and driver system, and using the another data management and driver system to manage and drive the SCSI signals from the another of the at least two SCSI interfaces to the one of the at least two SCSI interfaces;

wherein the step of shifting and receiving from the one of the at least two SCSI interfaces receiving the SCSI signals from the one of the at least two SCSI interfaces, arbitrating between the SCSI signals as to which of the SCSI signals are to be transmitted to the another of the at least two SCSI interfaces, selecting a set of the SCSI signals that the one of the at least two SCSI interfaces will transmit to the another of the at least two SCSI interfaces, and driving the set of the SCSI signals from the one of the at least two SCSI interfaces to the another of the at least two interfaces;

wherein the arbitrating step further comprises the step of:

receiving a bit from twenty seven bits of the converted back SCSI signals from the another of the at least two SCSI interfaces, determining whether the bit is equal to one and a bus value of the one of the at least two SCSI interfaces equals zero, driving the bus value to equal one if the bit is equal to one and the bus value is equal to zero, determining whether the bit is equal to zero and the bus value is equal to one if the bit is not equal to one and the bus value is not equal zero, stopping drive of the bus value to allow the bus value to equal zero if the bit is equal to zero and the bus value is equal to one, moving directly to determine if all of the twenty seven bits have been processed if the bit is equal to the bus value, determining if all of the twenty seven bits have been processed, obtaining a next bit and repeating the above steps if all of the twenty seven bits have not been processed, and determining whether a select has been activated to end the arbitrating step if all of the twenty seven bits have been processed.

11. The method according to claim 10 wherein the selecting step further comprises the step of:

selecting the SCSI signals with priority and dropping the SCSI signals without priority.

12. A method of extending SCSI communications between at least two SCSI interfaces comprising the steps of:

receiving SCSI signals from one of the at least two SCSI interfaces, parallel loading the SCSI signals from the one of the at least two SCSI interfaces into a parallel register, serializing the SCSI signals from the one of the at least two SCSI interfaces into serial data, transmitting the serial data derived from the parallel register over an optical communication system, converting the transmitted serial databack to the SCSI signals from the one of the at least two SCSI interfaces, shifting and receiving the SCSI signals from the one of the at least two SCSI interfaces into a data management and driver system, and using the data management and driver system to manage and drive the SCSI signals from the one of the at least two SCSI interfaces to another of the at least two SCSI interfaces;

wherein the shifting and receiving step from the another of the at least two SCSI interfaces receiving the SCSI signals from the another of the at least two SCSI interfaces, arbitrating between the SCSI signals as to which of the SCSI signals are to be transmitted to the one of the at least two SCSI interfaces, selecting a set of the SCSI signals that the another of the at least two SCSI interfaces will transmit to the one of the at least two SCSI interfaces, and driving the set of the SCSI signals from the another of the at least two SCSI interfaces to the one of the at least two interfaces;

receiving SCSI signals from the another of the at least two SCSI interfaces, parallel loading the SCSI signals from the another of the at least two SCSI interfaces into another parallel register, serializing the SCSI signals from the another of the at least two SCSI interfaces into serial data, transmitting the serial data derived from the another parallel register over another optical communication system, converting the transmitted serial data back to the SCSI signals from the another of the at least two SCSI interfaces, shifting and receiving the SCSI signals from the another of the at least two SCSI interfaces into another data management and driver system, and using the another data management and driver system to manage and drive the SCSI signals from the another of the at least two SCSI interfaces to the one of the at least two SCSI interfaces;

wherein the step of driving the set of the SCSI signals further comprises the steps of;

determining whether an input/output control signal from the SCSI signals has an one value, driving all inbound control lines and data busses at the one of the at least two interfaces to data having new values based on the SCSI signals which are inbound from the one of the at least two SCSI interfaces to the another of the at least two SCSI interfaces if the input/output control signal is equal to one, and driving all inbound control lines at the one of the at least two interfaces to data having new values based on the SCSI signals which are outbound from the another of the at least two SCSI interfaces to the one of the at least two SCSI interfaces if the input/output control signal is equal to zero.

13. The method according to claim 12 further comprising the steps of:

determining whether a bus at the one of the at least two SCSI interfaces is free, repeating the steps for the driving step if the bus is not free, and repeating all of the method steps if the bus is free.

* * * * *

UNITED STATES PATENT AND TRADEMARK OFFICE
CERTIFICATE OF CORRECTION

PATENT NO.     : 6,430,632 B1
DATED          : August 6, 2002
INVENTOR(S)    : Ain et al.

It is certified that error appears in the above-identified patent and that said Letters Patent is hereby corrected as shown below:

Column 11,
Lines 7- 10, replace: "using the another data management and driver system to manage and drive the SCSI signals from the another of the at least two SCSI interfaces to the one of the SCSI interfaces;"
with:
-- using the another data management and driver system to manage and drive the SCSI signals from the another of the at least two SCSI interfaces to the one of the at least two SCSI interfaces; --

Signed and Sealed this

Eleventh Day of February, 2003

JAMES E. ROGAN
*Director of the United States Patent and Trademark Office*